US008160607B2

(12) United States Patent
Choi et al.

(10) Patent No.: US 8,160,607 B2
(45) Date of Patent: Apr. 17, 2012

(54) MOBILE TERMINAL APPARATUS, METHOD, AND SERVER FOR SHARING CONTENTS

(75) Inventors: Yoo-jin Choi, Seoul (KR); Hyun-cheol Park, Suwon-si (KR); Chang-seog Ko, Hwaseong-si (KR); Young-sun Kim, Suwon-si (KR); Sang-woong Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1103 days.

(21) Appl. No.: 12/016,377

(22) Filed: Jan. 18, 2008

(65) Prior Publication Data

US 2009/0011772 A1   Jan. 8, 2009

(30) Foreign Application Priority Data

Jul. 2, 2007   (KR) .................. 10-2007-0066190

(51) Int. Cl.
*H04Q 7/20* (2006.01)
(52) U.S. Cl. .................. 455/456.1; 455/422.1
(58) Field of Classification Search ........... 455/414.1, 455/414.2, 456.1, 456.2, 456.3, 457
See application file for complete search history.

(56) References Cited

U.S. PATENT DOCUMENTS

| 7,212,829 | B1 * | 5/2007 | Lau et al. | 455/456.1 |
| 2004/0203931 | A1 * | 10/2004 | Karaoguz | 455/457 |
| 2006/0148512 | A1 * | 7/2006 | Ekholm et al. | 455/550.1 |
| 2006/0194589 | A1 * | 8/2006 | Sankisa | 455/456.1 |
| 2007/0219708 | A1 * | 9/2007 | Brasche et al. | 701/207 |

FOREIGN PATENT DOCUMENTS

| KR | 10-2005-0047271 A | 5/2005 |
| KR | 10-2005-0110897 A | 11/2005 |
| KR | 10-2006-0124362 A | 12/2006 |

* cited by examiner

*Primary Examiner* — Dwayne Bost
*Assistant Examiner* — Myron Wyche
(74) *Attorney, Agent, or Firm* — Sughrue Mion, PLLC

(57) ABSTRACT

A mobile terminal apparatus and method for sharing contents are provided. The mobile terminal apparatus includes a storage unit storing location information on an area; a location determination unit for determining a location of the mobile terminal apparatus; a network unit forming a network with one or more other mobile terminal apparatuses in the area; a control unit checking whether the mobile terminal apparatus has entered the area, based on the location information on the area and the determined location; and a screen configuration unit configuring a screen for providing information indicating locations of the one or more other mobile terminal apparatuses; wherein the control unit controls the network unit whereby the network unit obtains contents contained in one of the one or more other mobile terminal apparatuses, wherein the one mobile terminal apparatus is selected based on the information displayed on the screen and indicating the locations of the one or more other mobile terminal apparatuses. According to the apparatus and method, it is possible for users to share and watch user-created private media in real-time using bidirectional networking. Therefore, efficiency of media usage is increased.

20 Claims, 5 Drawing Sheets

MOBILE TERMINAL APPARATUS, METHOD, AND SERVER FOR SHARING CONTENTS

CROSS-REFERENCE TO RELATED PATENT APPLICATION

This application claims priority from Korean Patent Application No. 10-2007-0066190, filed on Jul. 2, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to sharing contents, and more particularly, to efficiently sharing contents between mobile terminal apparatuses in an area in which an event occurs.

2. Description of the Related Art

User terminal apparatuses capable of creating media contents such as still images and video clips that can be reproduced are now commonplace. In this manner, due to an increase in the amount of user terminal apparatuses capable of creating media contents, users who used to passively receive and use media contents tend to mutually share and use personally created contents. Thus, a method of mutually and efficiently sharing huge contents created by a plurality of users and easily using the huge contents is necessary.

SUMMARY OF THE INVENTION

The present invention provides a mobile terminal apparatus for efficiently sharing contents between mobile terminal apparatuses in an area in which an event occurs, a server providing a service for sharing the contents, and a method of sharing the contents.

According to an aspect of the present invention, there is provided a mobile terminal apparatus for sharing contents, the mobile terminal apparatus including a storage unit storing location information on an area; a location determination unit determining a location of the mobile terminal apparatus; a network unit forming a network with one or more other mobile terminal apparatuses in the area; a control unit checking whether the mobile terminal apparatus has entered the area, based on the location information on the area and the determined location; and a screen configuration unit configuring a screen for providing information indicating locations of the one or more other mobile terminal apparatuses; wherein the control unit controls the network unit whereby the network unit obtains contents contained in one of the one or more other mobile terminal apparatuses, wherein the one mobile terminal apparatus is selected based on the information displayed on the screen and indicating the locations of the one or more other mobile terminal apparatuses.

According to another aspect of the present invention, there is provided a method of sharing contents between a mobile terminal apparatus and one or more other mobile terminal apparatuses, wherein the contents are stored in the one or more other mobile terminal apparatuses, the method including the operations of determining whether the mobile terminal apparatus has entered an area; forming a network between the mobile terminal apparatus and the one or more other mobile terminal apparatuses existing in the area; providing information indicating locations of the one or more other mobile terminal apparatuses; and obtaining contents from one of the one or more other mobile terminal apparatuses, wherein the one mobile terminal apparatus is selected based on the information displayed on a screen and indicating the locations of the one or more other mobile terminal apparatuses.

According to another aspect of the present invention, there is provided a server including a location management unit determining locations of one or more mobile terminal apparatuses which have entered an area, and managing information on the determined locations; a network management unit forming a network with the one or more mobile terminal apparatuses; a storage unit storing location information and map information on the area; and a control unit controlling the network unit whereby the network unit transmits location information on the one or more mobile terminal apparatuses in the area and the map information to the mobile terminal apparatus requesting sharing of contents, when one of the one or more mobile terminal apparatuses requests sharing of the contents created by other mobile terminal apparatus.

According to another aspect of the present invention, there is provided a computer readable recording medium having recorded thereon a program for executing a method of sharing contents between a mobile terminal apparatus and one or more other mobile terminal apparatuses, wherein the contents are stored in the one or more other mobile terminal apparatuses, the method including the operations of determining whether the mobile terminal apparatus has entered an area; forming a network between the mobile terminal apparatus and the one or more mobile terminal apparatuses existing in the area; providing information indicating locations of the one or more mobile terminal apparatuses; and obtaining contents from one of the one or more other mobile terminal apparatuses, wherein the one mobile terminal apparatus is selected based on the information displayed on a screen and indicating the locations of the one or more other mobile terminal apparatuses.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1A:
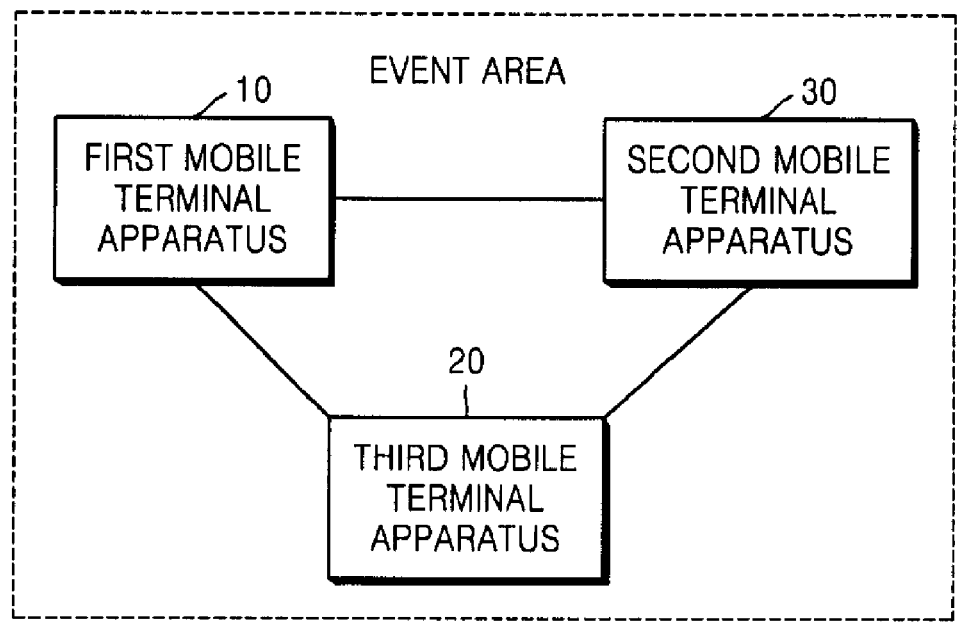
FIGS. 1A and 1B are block diagrams illustrating systems for sharing contents, according to exemplary embodiments of the present invention.
Figure 1B:
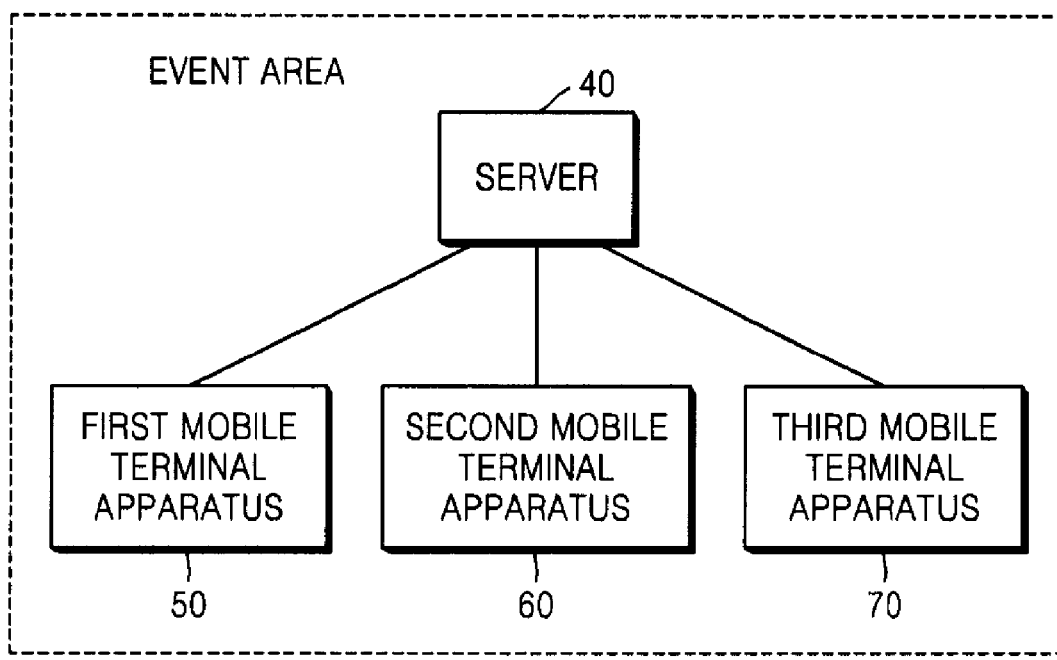

FIGS. 1A and 1B are block diagrams illustrating systems for sharing contents, according to exemplary embodiments of the present invention.

FIG. 1A is a block diagram illustrating a system in which contents are shared using a Peer to Peer (P2P) method. Referring to FIG. 1A, the system according to the current exemplary embodiment of the present invention includes a first mobile terminal apparatus 10, a second mobile terminal apparatus 20, and a third mobile terminal apparatus 30, all of which exist in an event area. Although FIG. 1A illustrates a case in which three mobile terminal apparatuses exist in the event area, the present invention is not limited thereto and several mobile terminal apparatuses may exist in the event area.

Hereinafter, an area in which an event occurs is referred to as the event area. The event may be an event, a festival, or the like, and may be a place having a specific area. There is no limitation to subjects for events. The event area is an area including a location in which an event occurs, and a range of the event area may be arbitrarily determined.

The first, second, and third mobile terminal apparatuses 10, 20, and 30 respectively contain location information on the event area, and have a function for detecting a current location by using a Global Positioning System (GPS) or the like. Also, the first, second, and third mobile terminal apparatuses 10, 20, and 30 respectively contain media data capable of being shared mutually.

For example, when the first mobile terminal apparatus 10 enters the event area while moving, the first mobile terminal apparatus 10 forms a wireless network with the second and third mobile terminal apparatuses 20 and 30. The wireless network among the first, second, and third mobile terminal apparatuses 10, 20, and 30 may be formed using various conventional methods. Also, the wireless network is temporarily formed among mobile terminal apparatuses which have entered the event area. When any one of the mobile terminal apparatuses leaves the event area, the wireless network formed with the leaving mobile terminal apparatus is revoked.

When the first mobile terminal apparatus 10 internally contains map information, the first mobile terminal apparatus 10 marks locations of not only the first mobile terminal apparatus 10 itself but also the second and third mobile terminal apparatuses 20 and 30 on the map information related to the current location, and provides a user with the map information. The locations of the second and third mobile terminal apparatuses 20 and 30 may be recognized by exchanging the mutual location information via the wireless network. Meanwhile, when the first mobile terminal apparatus 10 does not internally contain the map information, the first mobile terminal apparatus 10 may download map information including a current location from an external web server (not shown) providing a map information service. Then, the first mobile terminal apparatus 10 may mark the locations of the second and third mobile terminal apparatuses 20 and 30 on the downloaded map information, and provide the user with the location information.

When the user checks the locations of the second and third mobile terminal apparatuses 20 and 30 in the event area, wherein the locations are marked on a screen of the first mobile terminal apparatus 10, and inputs a user input signal for selecting the location of the second mobile terminal apparatus 20 to the first mobile terminal apparatus 10, the first mobile terminal apparatus 10 may request and receive desired contents from the second mobile terminal apparatus 20. In particular, when the second mobile terminal apparatus 20 contains media contents such as still images, video clips, and the like which are being created or have been created at a corresponding location, the first mobile terminal apparatus 10 may easily share the media contents created by the second mobile terminal apparatus 20 even though the first mobile terminal apparatus 10 does not move to another location in the event area.

FIG. 1B is a block diagram illustrating a system in which contents are shared among mobile terminal apparatuses, according to another exemplary embodiment of the present invention. Referring to FIG. 1B, the system according to the current exemplary embodiment of the present invention includes a server 40 which manages locations of mobile terminal apparatuses entering an event area, and provides a service for sharing the contents. The server 40 may search a map database (not shown) and a location information database (not shown) including location information on the event area for map information and location information.

Referring to FIG. 1B, first, second, and third mobile terminal apparatuses 50, 60, and 70 have entered the event area. When the first, second, and third mobile terminal apparatuses 50, 60, and 70 enter the event area, the server 40 forms a network with the first, second, and third mobile terminal apparatuses 50, 60, and 70, and checks locations of the first, second, and third mobile terminal apparatuses 50, 60, and 70.

The server 40 may check whether the first, second, and third mobile terminal apparatuses 50, 60, and 70 have entered the event area, and the locations of the first, second, and third mobile terminal apparatuses 50, 60, and 70 in the event area, by using a GPS. Otherwise, when Radio Frequency Identification (RFID) tags included in the first, second, and third mobile terminal apparatuses 50, 60, and 70 have location information according to identification information, the server 40 may read the RFID tags so as to determine whether the first, second, and third mobile terminal apparatuses 50, 60, and 70 have entered the event area, and the exact locations of the first, second, and third mobile terminal apparatuses 50, 60, and 70. The location information according to the identification information of the RFID tags, for example when the event area is a stadium, may be a seat number of the stadium, and the server 40 may obtain the location information corresponding to the seat number.

The server 40 may provide the first, second, and third mobile terminal apparatuses 50, 60, and 70 with map information including information on the locations of the first, second, and third mobile terminal apparatuses 50, 60, and 70 in the event area, wherein the first, second, and third mobile terminal apparatuses 50, 60, and 70 are connected via the wireless network. For example, when a user uses the first mobile terminal apparatus 50, and the map information including the locations of the second and third mobile terminal apparatuses 60 and 70 included in the event area, is displayed on a screen of the first mobile terminal apparatus 50, the user may select the location of the second mobile terminal apparatus 60. Then, the first mobile terminal apparatus 50 may request contents contained in the second mobile terminal apparatus 60 and download the contents. When the user selects the second mobile terminal apparatus 60, the user also selects contents media together that are generated by the second mobile terminal apparatus 60. The selected contents may have been captured where the second mobile terminal apparatus was placed and related to the event area. By doing so, the first mobile terminal apparatus 50 may share the contents contained in the second mobile terminal apparatus 60.

Figure 2:
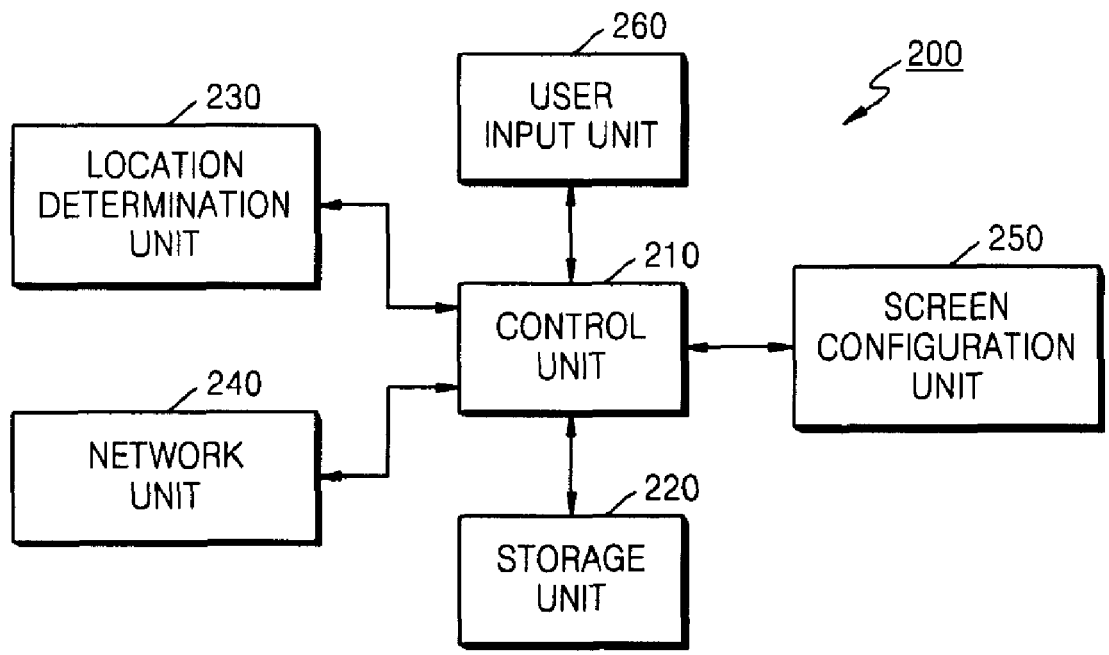
FIG. 2 is a block diagram illustrating a configuration of a mobile terminal apparatus for sharing contents, according to an exemplary embodiment of the present invention.

FIG. 2 is a block diagram illustrating a configuration of a mobile terminal apparatus 200 for sharing contents, according to an exemplary embodiment of the present invention.

Referring to FIG. 2, the mobile terminal apparatus 200 according to the current exemplary embodiment of the present invention includes a control unit 210, a storage unit 220, a location determination unit 230, a network unit 240, a screen configuration unit 250, and a user input unit 260. The mobile terminal apparatus 200 according to the current exemplary embodiment of the present invention may be embodied as various forms of portable terminals having a wireless communication function. Also, the mobile terminal apparatus 200 may be embodied in various type of portable terminals including wireless telecommunication function. The mobile terminal apparatus 200 may further include a contents creation means such as a digital camera or a camcorder capable of creating pictures and video data. In the present invention, the contents include privately created media contents that are created related to an event area by respective mobile terminal apparatuses existing in the event area.

The control unit 210 centrally controls the mobile terminal apparatus 200 by controlling data exchange between the constituent components of the mobile terminal apparatus 200.

The storage unit 220 stores location information on the event area in which an event occurs.

The location determination unit 230 determines a location of the mobile terminal apparatus 200. The location determination unit 230 may determine the location of the mobile terminal apparatus 200 by using a GPS.

The network unit 240 forms a network with one or more other mobile terminal apparatuses existing in the event area. The network unit 240 may form an Ad-hoc network with the one or more other mobile terminal apparatuses existing in the event area. The control unit 210 controls the network unit 240 so that the contents contained in the one or more other mobile terminal apparatuses are obtained.

Based on the location information on the event area, and the location determined by the location determination unit 230, the control unit 210 may check whether the mobile terminal apparatus 200 has entered the event area. When it is determined that the mobile terminal apparatus 200 has entered the event area, the control unit 210 controls the network unit 240 so that the network unit 240 forms the network with the one or more other mobile terminal apparatuses existing in the event area.

The screen configuration unit 250 controlled by the control unit 210 configures a screen for providing information indicating the locations of the one or more other mobile terminal apparatuses.

The storage unit 220 may further store map information indicating the event area. The control unit 210 receives location information on the one or more other mobile terminal apparatuses via the network unit 240. The control unit 210 may control the screen configuration unit 250 so that the screen configuration unit 250 may create and provide map information including the locations of the one or more other mobile terminal apparatuses, by using the received location information.

When the map information is not stored in the mobile terminal apparatus 200, the control unit 210 may connect to a server providing map information via the network unit 240 and receive the map information, or receive the location information of the one or more other mobile terminal apparatuses by communicating with the one or more other mobile terminal apparatuses. Then, the control unit 210 may control the screen configuration unit 250 so that the screen configuration unit 250 may create the map information including the locations of the one or more other mobile terminal apparatuses, by using the map information indicating the event area and the location information of the one or more other mobile terminal apparatuses.

The user input unit 260 receives a user input signal and transfers the user input signal to the control unit 210. The control unit 210 controls the mobile terminal apparatus 200 according to the user input signal.

When the map information indicating at least one location of other mobile terminal apparatus is displayed on the screen (not shown), a user selects one of the locations of the one or more other mobile terminal apparatuses and, then, the control unit 210 controls the network unit 240 so that the network unit 240 requests the mobile selected terminal apparatus for the contents, and receives the requested contents.

The example in which the mobile terminal apparatus 200 directly forms a network with one or more other mobile terminal apparatuses existing in the event area using a P2P method and shares contents has been described with reference to FIG. 1A. However, as described with reference to FIG. 1B, contents contained by other mobile terminal apparatuses may be obtained via a server capable of managing the locations of the mobile terminal apparatuses in the event area by checking the locations, and providing a service for sharing the contents.

That is, the control unit 210 may control the network unit 240 so that the network unit 240 requests and receives the contents from the one or more other mobile terminal apparatuses via the server connected with the one or more other mobile terminal apparatuses existing in the event area.

Figure 3:
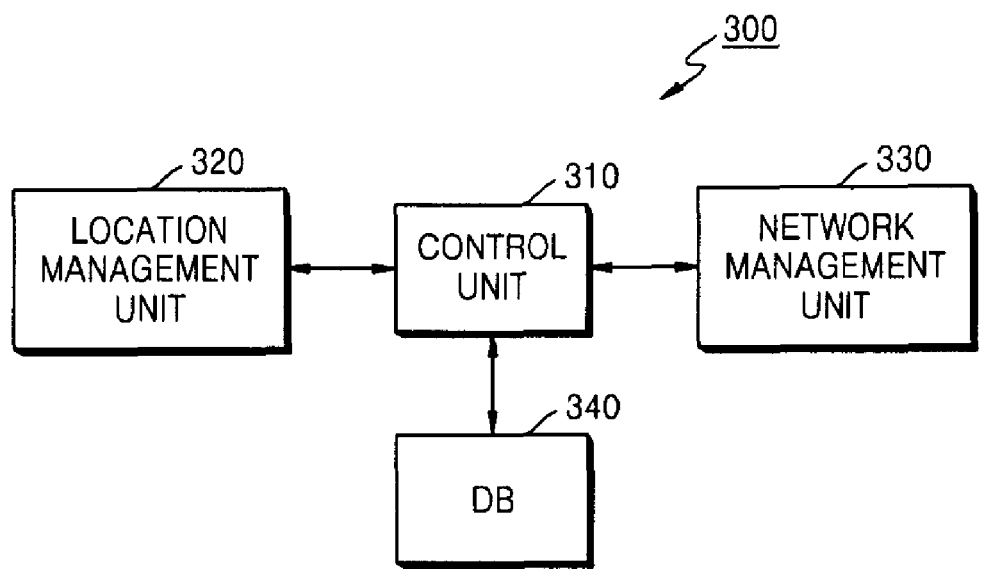
FIG. 3 is a block diagram illustrating a server connecting with one or more mobile terminal apparatuses and providing a service for sharing contents, according to an exemplary embodiment of the present invention.

FIG. 3 is a block diagram illustrating a server 300 connecting with one or more mobile terminal apparatuses and providing a service for sharing contents, according to an exemplary embodiment of the present invention.

Referring to FIG. 3, the server 300 providing the service for sharing privately created contents according to the current exemplary embodiment of the present invention includes a control unit 310, a location management unit 320, a network management unit 330, and a storage unit 340 which may be a database.

The location management unit 320 detects whether mobile terminal apparatuses have entered an event area in which an event occurs, determines locations of one or more mobile terminal apparatuses which have entered the event area, and manages information on the determined locations. When the mobile terminal apparatus 200 of FIG. 2 and the server 300 use a RFID system, the location management unit 320 may recognize and read a RFID tag included in the mobile terminal apparatus 200 so as to check whether the mobile terminal apparatus 200 has entered the event area. When the read RFID tag includes information indicating a specific location included in the event area, for example a seat number of a stadium, the location management unit 320 may determine a location of the mobile terminal apparatus 200 by using the location information included in the RFID tag. Otherwise, the location management unit 320 may check whether the mobile terminal apparatus 200 has entered the event area, and determine the location of the mobile terminal apparatus 200, by using a GPS.

The network management unit 330 forms a network with the one or more mobile terminal apparatuses which have entered the event area.

The storage unit 340 stores location information and map information on the event area.

From among two or more of the mobile terminal apparatuses, when one of the mobile terminal apparatuses requests sharing of contents created by another of the mobile terminal apparatuses, the control unit 310 controls the network management unit 330 so that the network management unit 330 transmits location information and map information on one of the mobile terminal apparatuses in the event area to another of the mobile terminal apparatuses which has requested sharing of the contents. The control unit 310 may transmit data comprising the map on which the locations of the one or more mobile terminal apparatuses are marked to the mobile terminal apparatus which has requested sharing of the contents.

When the mobile terminal apparatus which has requested sharing of the contents requests contents created by another mobile terminal apparatus at a specific location, the control unit 310 receives the requested contents from the other mobile terminal apparatus and transmits the received contents to the mobile terminal apparatus which has requested the contents.

Figure 4:
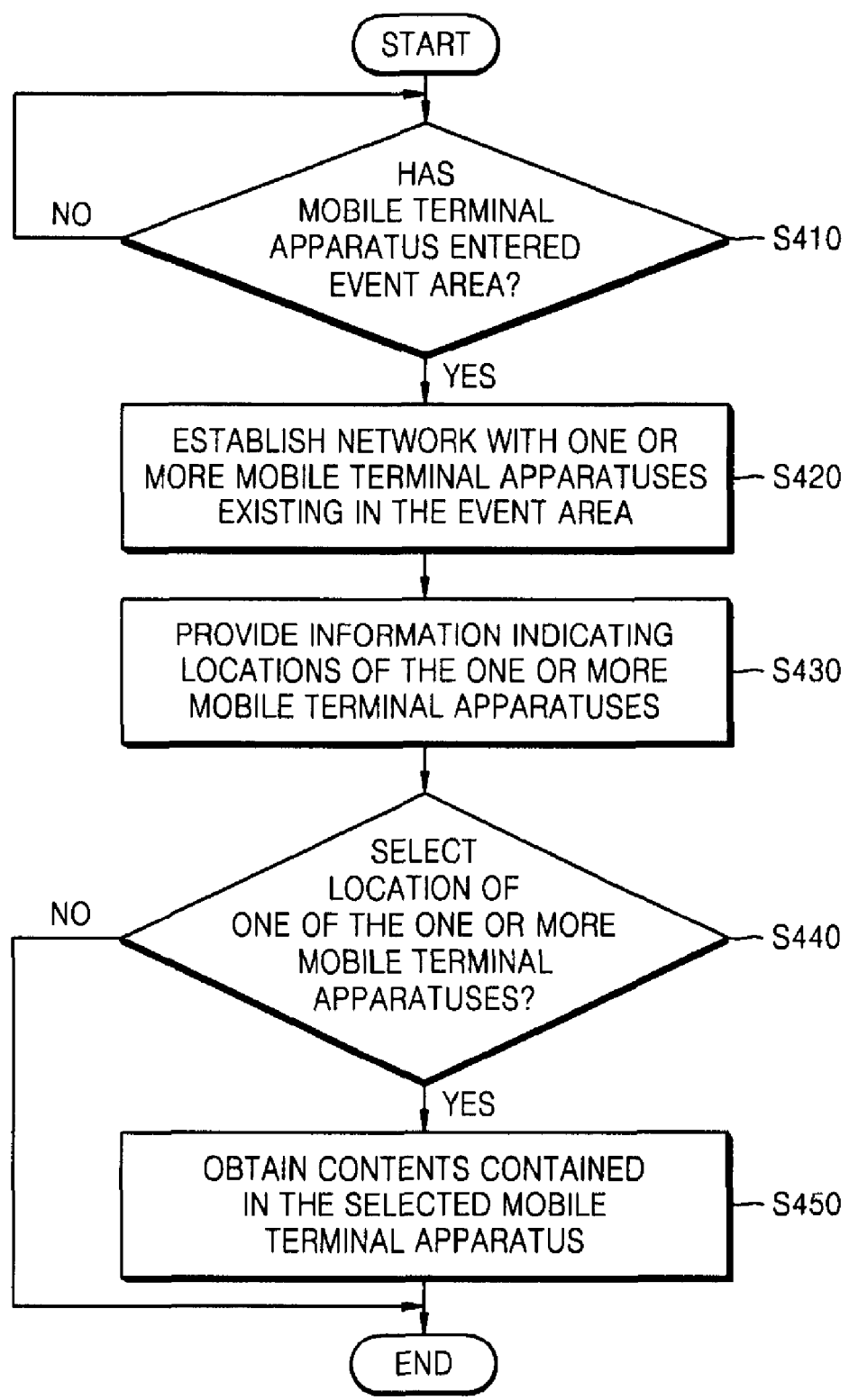
FIG. 4 is a flowchart illustrating a method of sharing contents, according to an exemplary embodiment of the present invention.

FIG. 4 is a flowchart illustrating a method of sharing contents, according to an exemplary embodiment of the present invention.

When the present invention is embodied using a P2P method, each operation is performed by respective mobile terminal apparatuses which enter an event area. However, when the present invention is embodied using a server, the server performs each operation.

In operation S410, it is determined whether a mobile terminal apparatus has entered an event area in which an event occurs. A location of the mobile terminal apparatus may be determined by using a GPS.

In operation S420, a network is formed between the mobile terminal apparatus and one or more other mobile terminal apparatuses existing in the event area. In operation S420, a wireless Ad-hoc network environment may be formed with the one or more other mobile terminal apparatuses existing in the event area.

In operation S430, information indicating locations of the one or more other mobile terminal apparatuses is provided. Operation S430 may be performed by receiving the location information on the one or more other mobile terminal apparatuses, and providing map information created by including the locations of the one or more other mobile terminal apparatuses in map information stored in the mobile terminal apparatus and indicating the event area.

Otherwise, operation S430 may be performed by receiving map information indicating the event area from a map information providing server, receiving the respective location information from the one or more other mobile terminal apparatuses, and generating map on which the locations of the one or more other mobile terminal apparatuses are marked.

In S440, a user input signal selecting one of the locations of the one or more other mobile terminal apparatuses is received. In S450, contents are obtained from the mobile terminal apparatus at the selected location. S450 may be performed via the server or a P2P method.

FIGS. 5A through 5D are diagrams of screens for explaining a method of sharing contents between mobile terminal apparatuses, according to an exemplary embodiment of the present invention.

Referring to FIGS. 5A through 5D, a process in which a user using a mobile terminal apparatus at a football match shares contents with another user's mobile terminal apparatus is described below. The mobile terminal apparatuses of the user and the other user are respectively referred as a first mobile terminal apparatus and a second mobile terminal apparatus. In addition, contents shared between the first and second terminal apparatuses are referred to as images created by being recorded at each location, and including scenes related to the football match.

Figure 5A:
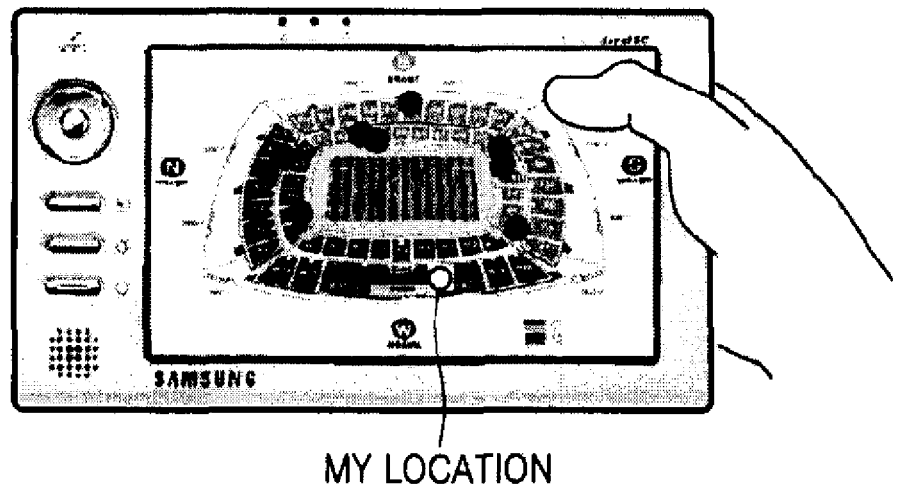
FIGS. 5A through 5D are diagrams of screens for explaining a method of sharing contents between mobile terminal apparatuses, according to an exemplary embodiment of the present invention.

A process of sharing media between the first and second terminal apparatuses using a P2P method is described below. The first mobile terminal apparatus stores location information showing the layout of a football stadium in which the football match is taking place. The first mobile terminal apparatus checks a current location of itself. When the current location of the first mobile terminal apparatus is within the football stadium, the first mobile terminal apparatus detects whether there are other mobile terminal apparatuses within the football stadium, and locations of the other mobile terminal apparatuses, and forms a network with the detected other mobile terminal apparatuses. Next, as illustrated in FIG. 5A, the first mobile terminal apparatus marks the locations of the detected other mobile terminal apparatuses on map information showing a map of the football stadium, and provides the user with the location information.

Figure 5B:
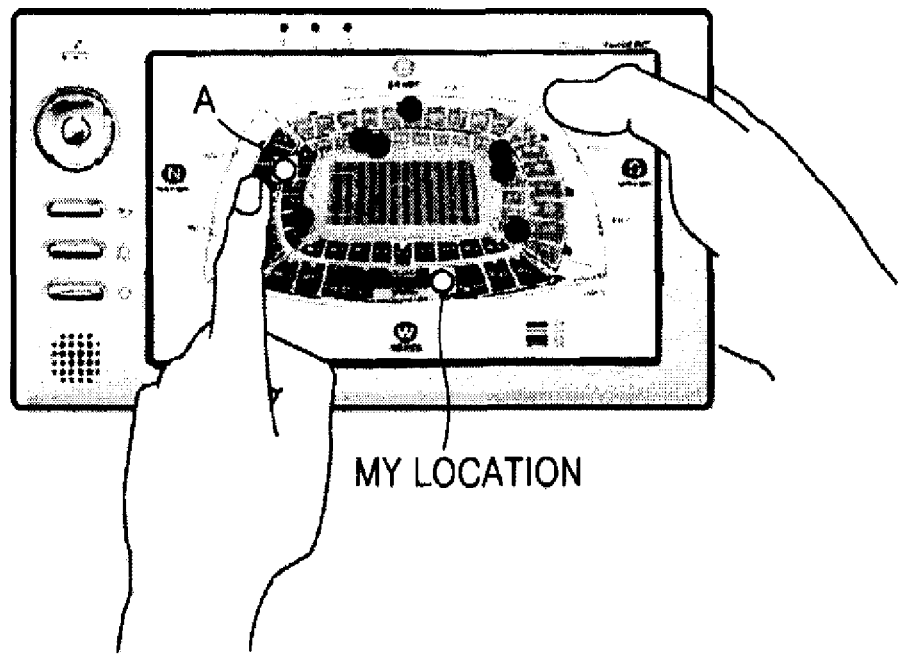

After the football match starts, while the user watches the match, when the user wants to watch scenes related to the match at other locations, the user selects a desired location, e.g., an icon of location A in FIG. 5B, from among the locations of the other mobile terminal apparatuses included in the map information, as illustrated in FIG. 5B.

Figure 5C:
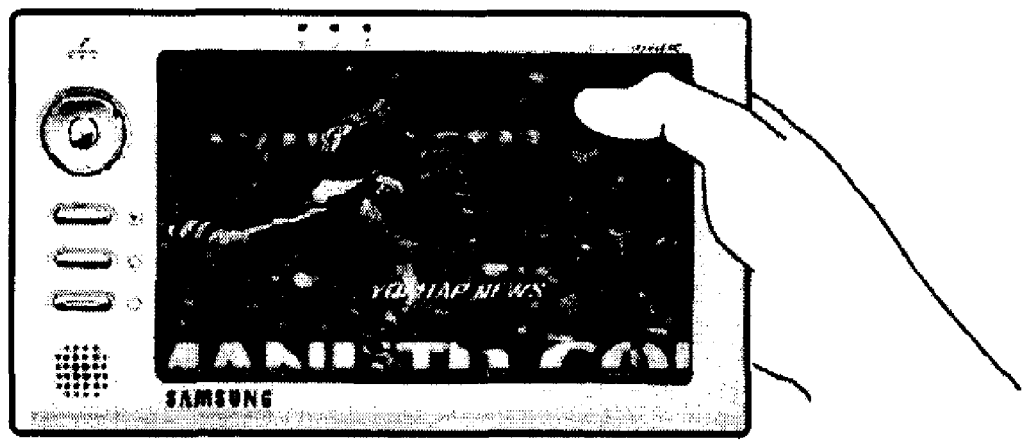
Figure 5D:

Then, the first mobile terminal apparatus requests the second mobile terminal apparatus for contents including match scenes, and which are currently being created in the second mobile terminal apparatus existing at the location A, and the second mobile terminal apparatus transmits the requested contents to the first mobile terminal apparatus. Then, as illustrated in FIG. 5C, the first mobile terminal apparatus may provide the user with the images transmitted by the second mobile terminal apparatus to the first mobile terminal apparatus. When the user selects a mobile terminal apparatus at another location in the football stadium, the first mobile terminal apparatus may provide the user with images created by being recorded at a different angle, and including the match scenes, by displaying the images as illustrated in FIG. 5D using the aforementioned process.

As described above, the process illustrated in FIGS. 5A through 5D may be performed by a server capable of managing the locations of mobile terminal apparatuses in the event area.

As described above, according to the present invention, it is possible for users to share and watch user-created private media in real-time via bidirectional networking, not a conventional unidirectional transmission of data. Therefore, efficiency of media usage is increased.

Also, according to the present invention, it is possible to share contents created in real-time by users at respectively different locations and angles in an event area, wherein the contents are related to a common event. Accordingly, it is possible to obtain an effect such as a television multi-view service by only forming a network between mobile terminal apparatuses in the event area.

The invention can be embodied as computer readable code on a computer readable recording medium. Functional programs, code, and code segments for accomplishing the present invention can be easily construed by programmers skilled in the art to which the present invention pertains. The computer readable recording medium is any data storage device that can store programs or data which can be thereafter read by a computer system. Examples of the computer readable recording medium include read-only memory (ROM), random-access memory (RAM), CD-ROMs, magnetic tapes, hard disks, floppy disks, optical disc, flash memory, and so on. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A mobile terminal apparatus for sharing contents, the mobile terminal apparatus comprising:
    a storage unit which stores location information on an area;
    a location determination unit which determines a location of the mobile terminal apparatus;
    a network unit which forms a network with one or more other mobile terminal apparatuses in the area;
    a control unit which checks whether the mobile terminal apparatus has entered the area, based on the location information on the area and the determined location; and
    a screen configuration unit which configures a screen for providing information indicating locations of the one or more other mobile terminal apparatuses;
    wherein the control unit controls the network unit whereby the network unit obtains contents contained in one of the one or more other mobile terminal apparatuses, wherein the one mobile terminal apparatus is selected based on the information displayed on the screen, and
    wherein the control unit controls the network unit whereby the network unit obtains contents from the one or more other mobile terminal apparatuses via a server connected with the one or more other mobile terminal apparatuses existing in the area.

2. The mobile terminal apparatus of claim 1, wherein the location determination unit determines the location of the mobile terminal apparatus by using a Global Positioning System (GPS).

3. The mobile terminal apparatus of claim 1, wherein the network unit forms a wireless Ad-hoc network with the one or more other mobile terminal apparatuses in the area.

4. The mobile terminal apparatus of claim 1, wherein the storage unit stores map information showing the layout of the area, and the control unit controls the screen configuration unit whereby the screen configuration unit creates map information on which the locations of the one or more other mobile terminal apparatuses are marked by using the location information on the one or more other mobile terminal apparatuses received via the network unit.

5. The mobile terminal apparatus of claim 1, wherein the control unit controls the screen configuration unit whereby the screen configuration unit creates map information indicating the locations of the one or more other mobile terminal apparatuses by using the map information indicating the area and the location information on the one or more other mobile terminal apparatuses received via the network unit.

6. The mobile terminal apparatus of claim 1, wherein the control unit controls the network unit whereby the network unit obtains contents from the one or more other mobile terminal apparatuses existing in the area using a Peer to Peer (P2P) method.

7. The mobile terminal apparatus of claim 1 further comprising a user input unit which receives a user input signal,
    wherein, when the information indicating the locations of the one or more other mobile terminal apparatuses is provided and a user input signal selecting one of the locations of the one or more other mobile terminal apparatuses is received, the control unit controls the network unit whereby the network unit obtains contents from the mobile terminal apparatus at the selected location.

8. The mobile terminal apparatus of claim 1, wherein the contents are privately created media contents related to the area and created by respective mobile terminal apparatuses existing in the area.

9. A method of sharing contents between a mobile terminal apparatus and one or more other mobile terminal apparatuses, wherein the contents are stored in the one or more other mobile terminal apparatuses, the method comprising:
    determining whether the mobile terminal apparatus has entered an area;
    forming a network between the mobile terminal apparatus and the one or more other mobile terminal apparatuses existing in the area;
    providing information indicating locations of the one or more other mobile terminal apparatuses; and
    obtaining contents from one of the one or more other mobile terminal apparatuses, wherein the one mobile terminal apparatus is selected based on the information displayed on a screen and indicating the locations of the one or more other mobile terminal apparatuses,
    wherein the obtaining of the contents comprises obtaining the contents from the one or more other mobile terminal apparatuses via a server connected with the one or more other mobile terminal apparatuses existing in the area.

10. The method of claim 9, wherein the determining of whether the mobile terminal apparatus has entered the area is performed by using a Global Positioning System (GPS).

11. The method of claim 9, wherein the forming of the network comprises forming a wireless Ad-hoc network between the mobile terminal apparatus and the one or more mobile terminal apparatuses existing in the area.

12. The method of claim 9, wherein the providing of the information comprises:
    receiving location information on the one or more mobile terminal apparatuses; and
    creating and providing map information on which the locations of the one or more other mobile terminal apparatuses are marked by using map information showing a layout of the area, wherein the map information is stored in the mobile terminal apparatus, and the location information on the one or more other mobile terminal apparatuses.

13. The method of claim 9, wherein the providing of the information comprises:
    receiving map information showing a layout of the area from a map information providing server, and receiving the respective location information from the one or more other mobile terminal apparatuses; and
    creating and providing map information on which the locations of the one or more other mobile terminal apparatuses are marked by using the received map information and the received location information.

14. The method of claim 9, wherein the obtaining of the contents comprises requesting the one or more other mobile terminal apparatuses existing in the area for the contents by using a Peer to Peer (P2P) method and receiving the contents.

15. The method of claim 9, wherein, when the information indicating the locations of the one or more other mobile terminal apparatuses is provided and a user input signal selecting one of the locations of the one or more other mobile terminal apparatuses is received, the obtaining of the contents comprises obtaining the contents from the mobile terminal apparatus at the selected location.

16. The method of claim 9, wherein the contents are privately created media contents related to the area and created by respective mobile terminal apparatuses existing in the area.

17. A server comprising:
a location management unit which determines locations of one or more mobile terminal apparatuses which have entered an area, and managing information on the determined locations;
a network management unit which forms a network with the one or more mobile terminal apparatuses;
a storage unit which stores location information and map information on the area; and
a control unit which controls the network unit whereby the network unit transmits location information on the one or more mobile terminal apparatuses in the area and the map information to a mobile terminal apparatus requesting sharing of contents created by another mobile terminal apparatus.

18. The server of claim 17, wherein the location management unit detects entrance of the one or more mobile terminal apparatuses into the area by recognizing Radio Frequency Identification (RFID) tags of the one or more mobile terminal apparatuses, and manages information on the locations of the one or more mobile terminal apparatuses determined by using location information stored in the RFID tags.

19. The server of claim 17, wherein, when one of the one or more mobile terminal apparatuses requests sharing of the contents created by the other mobile terminal apparatus, the control unit receives the requested contents from the other mobile terminal apparatus and transmits the contents to the mobile terminal apparatus requesting sharing of the contents.

20. A non-transitory computer readable recording medium having embodied thereon instructions that, when executed by a computer causes the computer to perform a method of sharing contents between a mobile terminal apparatus and one or more other mobile terminal apparatuses, wherein the contents are stored in the one or more other mobile terminal apparatuses, the method comprising:
determining whether the mobile terminal apparatus has entered an area;
forming a network between the mobile terminal apparatus and the one or more mobile terminal apparatuses existing in the area;
providing information indicating locations of the one or more mobile terminal apparatuses; and
obtaining contents from one of the one or more other mobile terminal apparatuses, wherein the one mobile terminal apparatus is selected based on the information indicating the locations of the one or more other mobile terminal apparatuses,
wherein the obtaining of the contents comprises obtaining the contents from the one or more other mobile terminal apparatuses via a server connected with the one or more other mobile terminal apparatuses existing in the area.

* * * * *